United States Patent [19]

Tokudome et al.

[11] Patent Number: 5,218,657
[45] Date of Patent: Jun. 8, 1993

[54] OPTICAL FIBER CONNECTING FERRULE INCLUDING FLEXIBLE INTERMEDIATE SECTION

[75] Inventors: Kazuhiro Tokudome; Toshiaki Eguchi; Fumiaki Mochida, all of Tokyo, Japan

[73] Assignee: Honda Tsushin Kogyo Co., Ltd., Tokyo, Japan

[21] Appl. No.: 868,905

[22] Filed: Apr. 16, 1992

[30] Foreign Application Priority Data

Apr. 17, 1991 [JP] Japan .................. 3-110748

[51] Int. Cl.$^5$ .............................. G02B 6/26
[52] U.S. Cl. ........................ 385/70; 385/72; 385/60; 385/66; 385/78; 385/84; 385/139
[58] Field of Search ............ 385/60, 66, 70, 72, 385/78, 84, 139, 99, 147

[56] References Cited

U.S. PATENT DOCUMENTS 4,445,753  5/1984  Collignon ................ 385/72
4,593,970  6/1986  Rhodes ................... 385/138
4,770,481  9/1988  Haas ..................... 385/138
4,813,760  3/1989  Tanaka et al. ............ 385/69 X
4,818,061  4/1989  Iwano et al. ............. 385/72
4,904,046  2/1990  Paschke et al. .......... 385/138 X
4,929,052  5/1990  Colles et al. ........... 385/147
5,110,224  5/1992  Taylor et al. ........... 385/92

Primary Examiner—Brian Healy
Attorney, Agent, or Firm—Nikaido, Marmelstein, Murray & Oram

[57] ABSTRACT

An optical fiber connecting ferrule according to the present invention comprises head and tail cylindrical sections of relatively large diameter, and an intermediate cylindrical section of relatively small diameter integrally connected to said head and tail cylindrical sections. With this arrangement the ferrule can be flexibly bent at its intermediate cylindrical section under undesired force applied to the ferrule, thus causing no adverse effect on an associated slotted sleeve, and hence causing no insertion loss in transmission even when undesired force is applied to the ferrule.

4 Claims, 5 Drawing Sheets

OPTICAL FIBER CONNECTING FERRULE INCLUDING FLEXIBLE INTERMEDIATE SECTION

BACKGROUND OF THE INVENTION

1. Field of the Invention

The present invention relates to an optical fiber connecting ferrule to be used in optical communication systems or optical measuring systems. Hereinafter it is referred to as "ferrule".

2. Description of Related Art

FIG. 5 shows a conventional ferrule 24 as comprising a cylindrical body 20 (2.5 mm across) of hard ceramics such as zirconia ceramics and a collared tubular catch 21 of a metal such as stainless steel. The cylindrical body 20 has a through aperture 23 of the same diameter as an optical fiber. In use, an optical fiber is inserted in the through aperture 23 of the cylindrical body 20 to be fixed thereto by an adhesive agent such as epoxy resin.

FIG. 8 shows a relay connector 22 having a ferrule 24 fitted therein. The relay connector 22 is jointed to a square plug 27 and to a round plug 28 via an associated adapter 26.

Specifically, the square plug 27 is press-inserted into one end of the relay connector 22 until it is locked by nails 22a. The other end of the relay connector 22 is attached to one hollow projection of the adapter 26 by rotating and threadedly engaging the tapped cap 22b of the relay connector 22 with the threaded hollow projection of the adapter 26. The round plug 28 is connected to the other hollow projection of the adapter 26 by rotating and threadedly engaging the tapped cap 28a of the round plug 28 with the threaded hollow projection of the adapter 26.

The relay connector 22 has a slotted sleeve 32 to put opposing optical fibers in linear alignment. The slotted sleeve 32 is of a metal such as copper (See FIGS. 7A and 7B).

As described above, the square plug 27 is connected to the round plug 28 in axial alignment, and their optical fibers are exactly aligned with the aid of the associated slotted sleeve Assume that an external force is applied to the plug joint as indicated by arrow F in FIG. 8. Then, the ferrule body 24 cannot be flexibly deformed because it is of hard ceramics. The ferrules 27a and 28b of the square and round plugs 27 and 28 cannot be deformed, either. As a consequence, the slotted sleeve 32 will be expanded and deformed under stress.

As shown in FIG. 6, a conventional ferrule is used at the transmitting/receiving end of an optical communication apparatus 16, and application of undesired external force to the plug 25 will cause deformation of the slotted sleeve 32. Expansion of the slotted sleeve will cause an insertion loss in transmission at the relay connector, deteriorating the joint quality of opposing optical fibers.

SUMMARY OF THE INVENTION

One object of the present invention is to provide an optical fiber connecting ferrule which is capable of absorbing undesired external force which otherwise, would cause deformation of an associated slotted sleeve, and hence optical transmission loss.

To attain this object an optical fiber connecting ferrule according to the present invention comprises head and tail sections of relatively large diameter, and an intermediate section of relatively small diameter integrally connected to said head and tail sections, thereby permitting said intermediate section to be flexibly bent when said optical fiber connecting ferrule is subjected to undesired exterior force.

Other objects and advantages of the present invention will be understood from the following description of optical fiber connecting ferrules according to preferred embodiments of the present invention, which are shown in accompanying drawings.

DESCRIPTION OF THE PREFERRED EMBODIMENTS

Figure 1:
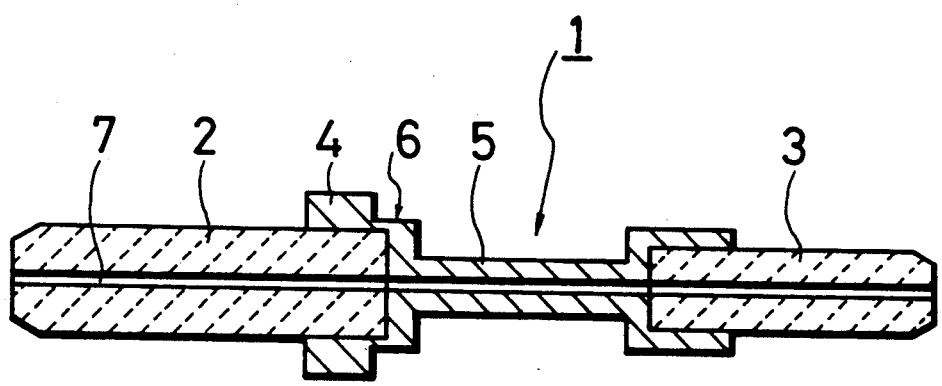
FIG. 1 is a longitudinal section of an optical fiber connecting ferrule according to a preferred embodiment of the present invention.

As shown in FIG. 1, an optical fiber connecting ferrule 1 according to the present invention comprises head and tail cylindrical sections 2 and 3 of relatively large diameter, and a collared intermediate body 6 having an intermediate cylyndrical section 5 of relatively small diameter and collars 4 formed at opposite ends of the section 5. The head and tail cylindrical sections 2 and 3 are integrally connected to the intermediate body 6 via its collars 4. As seen from the drawing, the head and tail cylindrical sections 2 and 3 and the intermediate cylindrical section 5 have through apertures 7 aligned to permit insertion of an optical fiber.

The head cylindrical section 2 is 2.5 mm in diameter, and the rear cylindrical section 3 is somewhat smaller than the head cylindrical section. As a matter of course the rear cylindrical section 3 may be as large as the head cylindrical section in diameter. The intermediate cylindrical section 5 is about 0.7 mm in diameter. Preferably the diameter of the intermediate section 5 is below 1 mm. The collared intermediate body 6 is made of a metal which is effective to bring about flexibility on its intermediate section 5 such as stainless steel.

Figure 2:
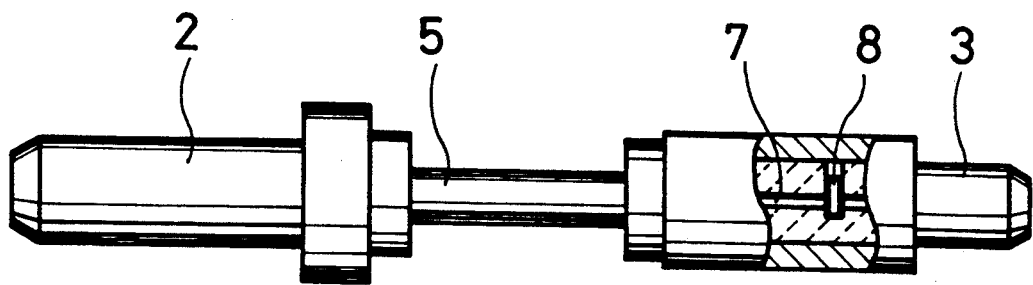
FIG. 2 is a side view of an optical fiber connecting ferrule according to another embodiment of the present invention, partly broken.

FIG. 2 shows another example of ferrule 1, the rear section 3 of which has a radial gap transversing the through aperture 7 to permit insertion of a shielding plate 8, thereby attenuating the optical signal. The shielding plate 8 may be a filter to permit transmission of light of selected wave length. The shielding plate 8 is preferably placed in the rear cylindrical section 3 of the ferrule 1 with a view to lessening the adverse effect caused by undesired stress on the shielding plate 8.

Figure 3A:
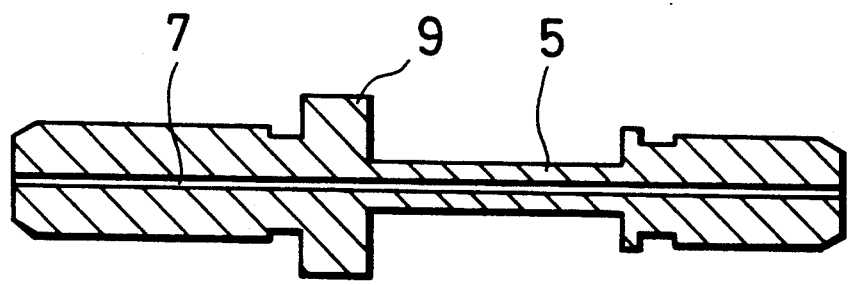
FIGS. 3A, 3B and 3C are longitudinal sections of optical fiber connecting ferrules according to still another embodiments of the present invention.
Figure 3B:
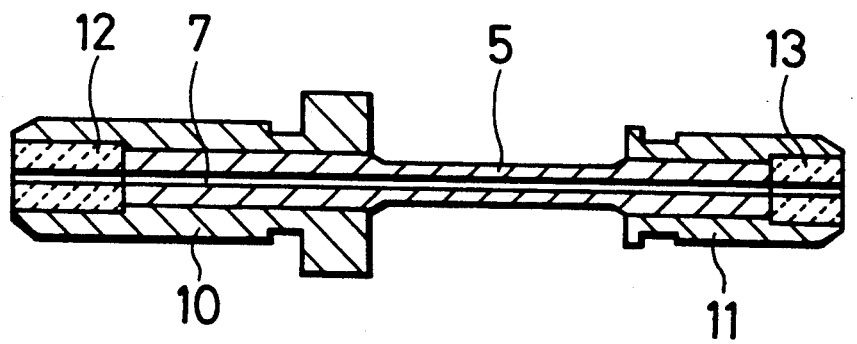
Figure 3C:
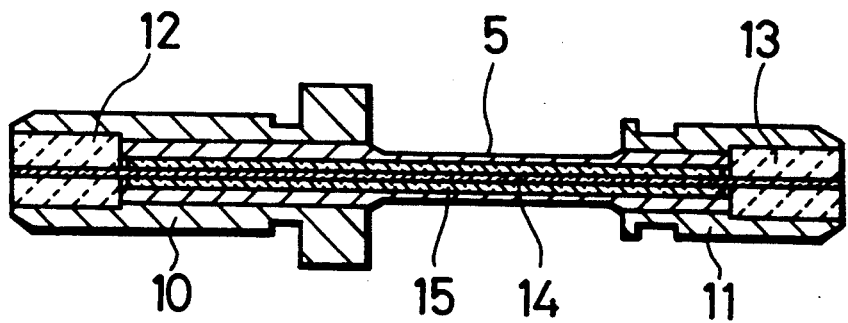

Referring to FIG. 3A, the whole body 9 of a ferrule may be integrally made of stainless steel. Referring to FIG. 3B, the head and tail cylindrical sections 10 and 11 of a ferrule are made of stainless steel, and cylindrical ceramic plugs 12 and 13 are inserted in the head and tail sections 10 and 11, and the intermediate cylindrical section 5 is made of stainless steel or copper alloy. Finally, referring to FIG. 3C, the ferrule of FIG. 3B has an optical fiber 14 and a sheath 15 inserted in its intermediate section 5 except for the opposite ceramic plugs 12 and 13.

Figure 4A:
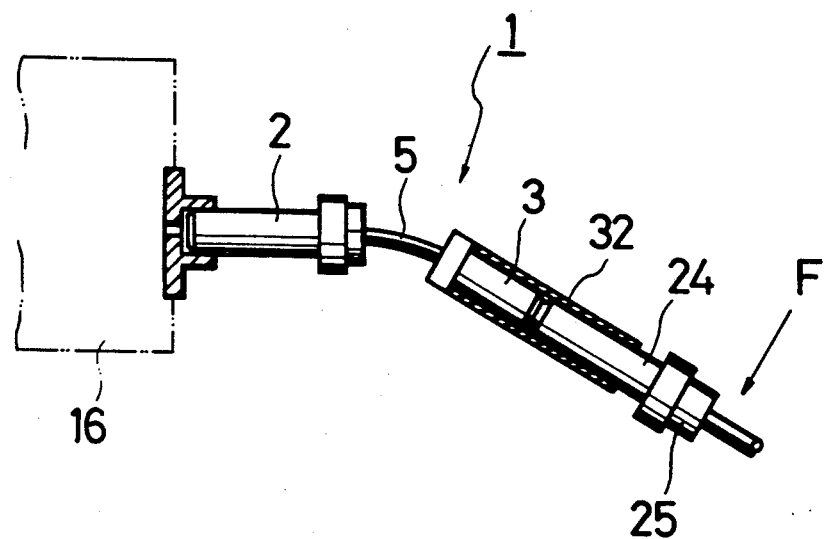
FIGS. 4A and 4B show how the optical fiber connecting ferrules according to the present invention are bent upon application of undesired external force.

FIG. 4 shows what condition a ferrule 1 according to the present invention is brought in when undesired force is applied to the ferrule. Specifically, in FIG. 4A the ferrule 1 is connected to the transmitting/receiving terminal of an optical communication apparatus 16. A plug 25 is aligned with and connected to the rear section 3 of the ferrule 1 by an associated slotted sleeve 32. When undesired force F is applied to the plug 25, the cylindrical intermediate section 5 of the ferrule 1 will be flexibly bent, thus preventing any deformation of the slotted sleeve 32, which otherwise, would be caused and is a cause for insertion loss in transmission.

The bending of the intermediate section 5 of the ferrule 1 is within the yielding limit of optical fiber to be inserted therein, and the intermediate section 5 will be restored to its stress-free position when external force is removed.

Figure 4B:
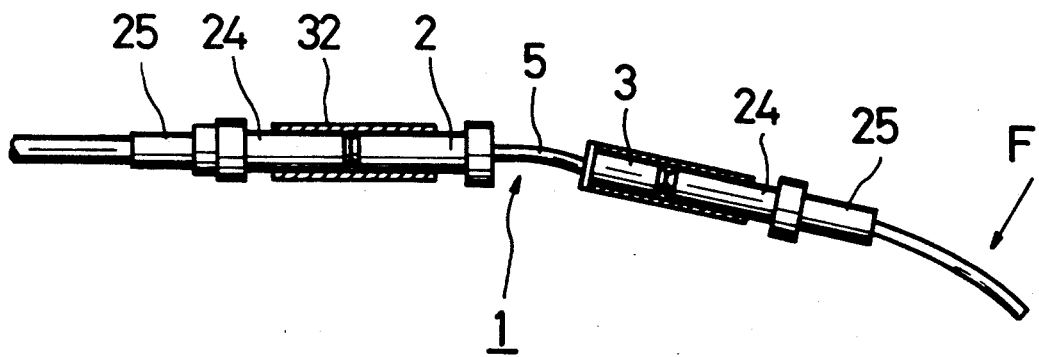
Figure 5:
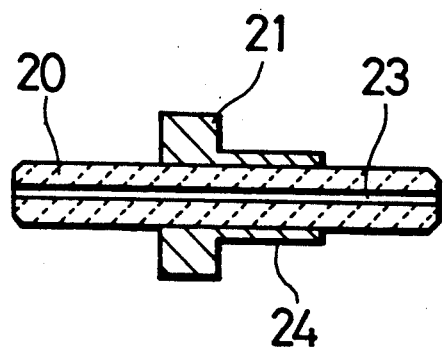
FIG. 5 is a longitudinal section of a conventional optical fiber connecting ferrule.
Figure 6:
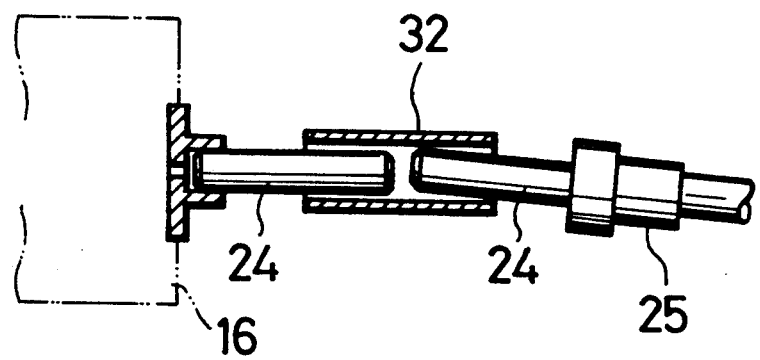
FIG. 6 shows how the conventional optical fiber connecting ferrule is bent upon application of undesired external force.
Figure 7A:
FIGS. 7A and 7B are front and side views of a slotted sleeve.
Figure 7B:
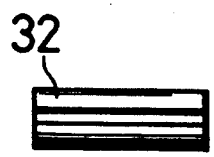
Figure 8:
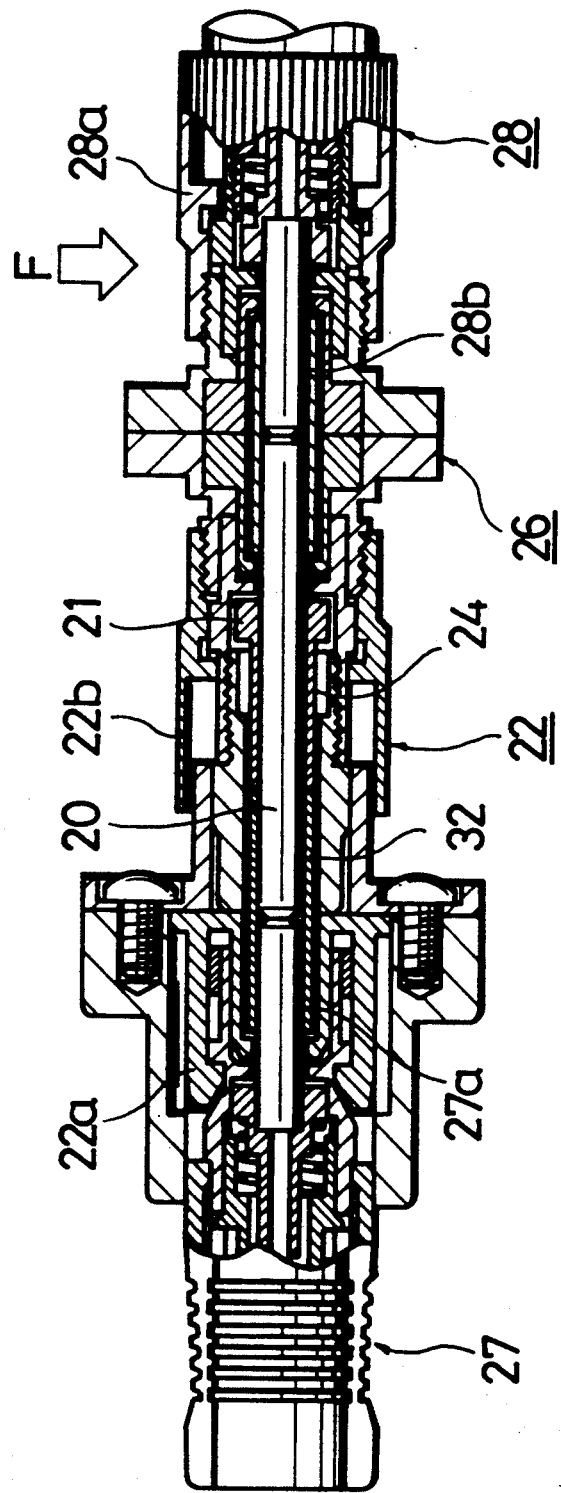
FIG. 8 is a longitudinal section of a conventional optical connector.

FIG. 4B shows a similar condition in case that a ferrule according to the present invention is applied to a relay. The same effect as described above will be caused.

As may be understood from the above, a ferrule according to the present invention is designed so as to be flexibly bent at its intermediate section of reduced diameter upon application of undesired force to the ferrule, thus causing no adverse effect on an associated slotted sleeve for alignment, and hence causing no insertion loss in transmission even when undesired force is applied to the ferrule.

We claim:

1. An optical fiber connecting ferrule comprising head and tail cylindrical sections of relatively large diameter, and an intermediate cylindrical section of relatively small diameter integrally connected to said head and tail sections, thereby permitting said intermediate cylindrical section to be flexibly bent when said optical fiber connecting ferrule is subjected to exterior force.

2. An optical fiber connecting ferrule claimed in claim 1, wherein said intermediate cylindrical section is made of stainless steel.

3. An optical fiber connecting ferrule claimed in claim 2, wherein said head and tail sections being made of ceramics, and the intermediate cylindrical section has collars at its opposite ends to receive and connect the head and tail cylindrical section integrally to the intermediate section.

4. An optical fiber connecting ferrule claimed in claim 1, wherein whole body of said ferrule is integrally made of stainless steel.

* * * * *